(12) United States Patent
Edara et al.

(10) Patent No.: US 10,554,733 B2
(45) Date of Patent: Feb. 4, 2020

(54) CONTROLLING CLIENTS IN DISTRIBUTED WI-FI NETWORKS

(71) Applicant: Plume Design, Inc., Palo Alto, CA (US)

(72) Inventors: Kiran Edara, Cupertino, CA (US); Kaixiang Hu, Fremont, CA (US); Jian Lu, Los Gatos, CA (US); Hong Fan, San Jose, CA (US); William McFarland, Portola Valley, CA (US)

(73) Assignee: Plume Design, Inc., Palo Alto, CA (US)

( * ) Notice: Subject to any disclaimer, the term of this patent is extended or adjusted under 35 U.S.C. 154(b) by 102 days.

(21) Appl. No.: 15/462,284

(22) Filed: Mar. 17, 2017

(65) Prior Publication Data
US 2017/0273013 A1 Sep. 21, 2017

Related U.S. Application Data

(60) Provisional application No. 62/310,609, filed on Mar. 18, 2016.

(51) Int. Cl.
| | |
|---|---|
| *H04L 29/08* | (2006.01) |
| *H04W 48/20* | (2009.01) |
| *H04W 36/22* | (2009.01) |
| *H04W 84/12* | (2009.01) |
| *H04W 28/08* | (2009.01) |

(52) U.S. Cl.
CPC .............. *H04L 67/10* (2013.01); *H04W 36/22* (2013.01); *H04W 48/20* (2013.01); *H04W 28/08* (2013.01); *H04W 84/12* (2013.01)

(58) Field of Classification Search
CPC ........ H04W 48/20; H04W 36/22; H04L 67/10
See application file for complete search history.

(56) References Cited

U.S. PATENT DOCUMENTS

| | | |
|---|---|---|
| 7,315,533 B2 | 1/2008 | Theobold et al. |
| 7,414,978 B2 | 8/2008 | Lun et al. |
| 7,953,403 B2 | 5/2011 | Nientiedt |
| 8,798,021 B2 | 8/2014 | Mangalvedhe et al. |
| 9,060,279 B2 | 6/2015 | Ganu et al. |
| 9,066,251 B2 | 6/2015 | Madan et al. |
| 9,131,391 B2 | 9/2015 | Madan et al. |
| 9,131,392 B2 | 9/2015 | Madan et al. |
| 9,420,528 B2 | 8/2016 | Madan et al. |
| 9,497,700 B2 | 11/2016 | Madan et al. |
| 9,510,214 B1 | 11/2016 | Balasubramaniam et al. |
| 9,516,579 B1 | 12/2016 | Diner et al. |
| 2006/0258395 A1 | 11/2006 | Cave et al. |
| 2007/0149172 A1 | 6/2007 | Dickinson |

(Continued)

*Primary Examiner* — Redentor Pasia
(74) *Attorney, Agent, or Firm* — Clements Bernard Walker; Lawrence A. Baratta, Jr.

(57) ABSTRACT

Systems and methods implemented by a cloud controller for steering Wi-Fi client devices in a Wi-Fi network include determining a client needs to be steered from a first access point to a second access point; selecting a client steering approach from a plurality of client steering approaches based on the client; and causing the client to be steered from the first access point to the second access point based on the selected client steering approach. The determining can be based on optimization performed by the cloud controller based on operational parameters associated with the Wi-Fi network.

20 Claims, 6 Drawing Sheets

(56) References Cited

U.S. PATENT DOCUMENTS

| | | |
|---|---|---|
| 2007/0242621 A1 | 10/2007 | Nandagopalan et al. |
| 2009/0257380 A1 | 10/2009 | Meier |
| 2009/0279427 A1 | 11/2009 | Ji et al. |
| 2009/0316585 A1 | 12/2009 | Srinivasan |
| 2009/0323632 A1 | 12/2009 | Nix |
| 2011/0039554 A1 | 2/2011 | Bims |
| 2011/0151886 A1 | 6/2011 | Grayson et al. |
| 2012/0002567 A1 | 1/2012 | Sun et al. |
| 2012/0087268 A1 | 4/2012 | Savoor et al. |
| 2012/0122503 A1 | 5/2012 | Ma et al. |
| 2012/0257585 A1 | 10/2012 | Sydor et al. |
| 2013/0201857 A1 | 8/2013 | Bhargava et al. |
| 2013/0272285 A1* | 10/2013 | Goldsmith ............ H04W 24/02 370/338 |
| 2014/0092765 A1 | 4/2014 | Agarwal et al. |
| 2014/0126410 A1 | 5/2014 | Agarwal et al. |
| 2014/0328190 A1 | 11/2014 | Lord et al. |
| 2015/0312820 A1* | 10/2015 | Yang .................. H04W 36/023 370/331 |
| 2016/0036657 A1* | 2/2016 | Ardeli .................. H04W 48/20 370/235 |
| 2016/0080949 A1 | 3/2016 | Chandrasekhar et al. |
| 2017/0111854 A1* | 4/2017 | Ho .......................... H04B 7/14 |
| 2018/0146390 A1* | 5/2018 | Kim ..................... H04W 24/02 |

\* cited by examiner

CONTROLLING CLIENTS IN DISTRIBUTED
WI-FI NETWORKS

CROSS-REFERENCE TO RELATED
APPLICATION(S)

The present patent/application claims priority to U.S. Provisional Patent Application No. 62/310,609, filed Mar. 18, 2016, and entitled "CONTROLLING CLIENTS IN DISTRIBUTED WI-FI NETWORKS," the contents of which are incorporated by reference.

FIELD OF THE DISCLOSURE

The present disclosure generally relates to wireless networking systems and methods. More particularly, the present disclosure relates to controlling Wi-Fi client devices in a distributed Wi-Fi network.

BACKGROUND OF THE DISCLOSURE

Wi-Fi networks (i.e., Wireless Local Area Networks (WLAN) based on the IEEE 802.11 standards) have become ubiquitous. People use them in their homes, at work, and in public spaces such as schools, cafes, even parks. Wi-Fi provides great convenience by eliminating wires and allowing for mobility. The applications that consumers run over Wi-Fi is continually expanding. Today people use Wi-Fi to carry all sorts of media, including video traffic, audio traffic, telephone calls, video conferencing, online gaming, and security camera video. Often traditional data services are also simultaneously in use, such as web browsing, file upload/download, disk drive backups, and any number of mobile device applications. In fact, Wi-Fi has become the primary connection between user devices and the Internet in the home or other locations. The vast majority of connected devices use Wi-Fi for their primary network connectivity.

Despite Wi-Fi's popularity and ubiquity, many consumers still experience difficulties with Wi-Fi. The challenges of supplying real-time media applications, like those listed above, put increasing demands on the throughput, latency, jitter, and robustness of Wi-Fi. Studies have shown that broadband access to the Internet through service providers is up 99.9% of the time at high data rates. However, despite the Internet arriving reliably and fast to the edge of consumer's homes, simply distributing the connection across the home via Wi-Fi is much less reliable leading to poor user experience.

Several issues prevent conventional Wi-Fi systems from performing well, including i) interference, ii) congestion, and iii) coverage. For interference, with the growth of Wi-Fi has come the growth of interference between different Wi-Fi networks which overlap. When two networks within range of each other carry high levels of traffic, they interfere with each other, reducing the throughput that either network can achieve. For congestion, within a single Wi-Fi network, there may be several communications sessions running. When several demanding applications are running, such as high definition video streams, the network can become saturated, leaving insufficient capacity to support the video streams.

For coverage, Wi-Fi signals attenuate with distance and when traveling through walls and other objects. In many environments, such as residences, reliable Wi-Fi service cannot be obtained in all rooms. Even if a basic connection can be obtained in all rooms, many of those locations will have poor performance due to a weak Wi-Fi signal. Various objects in a residence such as walls, doors, mirrors, people, and general clutter all interfere and attenuate Wi-Fi signals leading to slower data rates.

Two general approaches have been tried to improve the performance of conventional Wi-Fi systems. The first approach is to simply build more powerful single access points, in an attempt to cover a location with stronger signal strengths, thereby providing more complete coverage and higher data rates at a given location. However, this approach is limited by both regulatory limits on the allowed transmit power, and by the fundamental laws of nature. The difficulty of making such a powerful access point, whether by increasing the power, or increasing the number of transmit and receive antennas, grows exponentially with the achieved improvement. Practical improvements using these techniques lie in the range of 6 to 12 dB. However, a single additional wall can attenuate by 12 dB. Therefore, despite the huge difficulty and expense to gain 12 dB of link budget, the resulting system may not be able to transmit through even one additional wall. Any coverage holes that may have existed will still be present, devices that suffer poor throughput will still achieve relatively poor throughput, and the overall system capacity will be only modestly improved. In addition, this approach does nothing to improve the situation with interference and congestion. In fact, by increasing the transmit power, the amount of interference between networks actually goes up.

A second approach is to use repeaters or a mesh of Wi-Fi devices to repeat the Wi-Fi data throughout a location. This approach is a fundamentally better approach to achieving better coverage. By placing even a single repeater node in the center of a house, the distance that a single Wi-Fi transmission must traverse can be cut in half, halving also the number of walls that each hop of the Wi-Fi signal must traverse. This can make a change in the link budget of 40 dB or more, a huge change compared to the 6 to 12 dB type improvements that can be obtained by enhancing a single access point as described above. Mesh networks have similar properties as systems using Wi-Fi repeaters. A fully interconnected mesh adds the ability for all the repeaters to be able to communicate with each other, opening the possibility of packets being delivered via multiple hops following an arbitrary pathway through the network.

State of the art mesh or repeaters systems still have many limitations. Because the systems depend on localized control, they configure themselves to use the same frequency for all the backhaul communication between the repeaters or mesh nodes. This creates a severe system capacity problem. Consider a system that requires three hops through the network to get its packet to the destination. Since all three hops are on the same frequency channel, and because only one Wi-Fi radio can transmit at a time on a given channel among devices that are in range (where the range is determined by the long range of the lowest supported data rate), only one hop can be active at a time. Therefore, for this example, delivering a packet via three hops would consume three times the airtime on the one channel as delivering the packet directly. In the first hop, when the packet is moving from the Wi-Fi gateway to the first mesh node, all the other links in the house would need to stay silent. Similarly, as the packet is later sent from the first mesh node to a second mesh node, no other Wi-Fi devices in the home could transmit. Finally, the same would be true as the packet is moved from the second mesh node to the final destination. In all, the use of three hop repeating has reduced the network capacity by a factor of three. And, as with the case of a single access point, the repeater or mesh approach does nothing to help with the problems of interference or congestion. As before, the technique actually increases interference, as a single packet transmission becomes three separate transmissions, taking a total of 3× the airtime, generating 3× the interference to neighboring Wi-Fi networks.

BRIEF SUMMARY OF THE DISCLOSURE

In an exemplary embodiment, a method implemented by a cloud controller for steering Wi-Fi client devices in a Wi-Fi network includes determining a client needs to be steered from a first access point to a second access point; selecting a client steering approach from a plurality of client steering approaches based on the client; and causing the client to be steered from the first access point to the second access point based on the selected client steering approach. The determining can be based on optimization performed by the cloud controller based on operational parameters associated with the Wi-Fi network. The client steering approach can include causing the first access point to disassociate the client, causing the first access point to stop sending probe responses to the client, and, if the client still attempts to authenticate to the first access point, causing the first access point to send authentication failure to the client. The client steering approach can include informing the first access point that is should no longer be connected to the client; and informing the second access point to accept connection from the client. The client steering approach can include providing a Channel Switch Announcement (CSA) to the client through the first access point. The method can further include determining which client steering approaches work for each client and utilizing the determining in the selecting. The method can further include monitoring a frequency of the plurality of client steering approaches for a particular client type, wherein the selecting utilizes the frequency for the client based on the associated client type to select the client steering approach. The cloud controller can determine the client should be steered to the second access point and selects the client steering approach, and wherein the causing can include the cloud controller informing the first access point and the second access point such that the first access point and the second access point perform the client steering approach.

In another exemplary embodiment, a cloud controller configured to steer Wi-Fi client devices in a Wi-Fi network includes a network interface communicatively coupled to the Wi-Fi network; one or more processors communicatively coupled to the network interface; and memory storing instructions that, when executed, cause the one or more processors to: determine a client needs to be steered from a first access point to a second access point; select a client steering approach from a plurality of client steering approaches based on the client; and cause the client to be steered from the first access point to the second access point base don the selected client steering approach. The cloud controller can determine the client needs to be steered based on optimization based on operational parameters associated with the Wi-Fi network. The client steering approach can include the cloud controller causing the first access point to disassociate the client, causing the first access point to stop sending probe responses to the client, and, if the client still attempts to authenticate to the first access point, causing the first access point to send authentication failure to the client. The client steering approach can include the cloud controller providing a Channel Switch Announcement (CSA) to the client through the first access point. The memory storing instructions that, when executed, can further cause the one or more processors to determine which client steering approaches work for each client and utilizing the determining in the selecting. The memory storing instructions that, when executed, can further cause the one or more processors to monitor a frequency of the plurality of client steering approaches for a particular client type, wherein selection of the client steering approach utilizes the frequency for the client based on the associated client type. The cloud controller can determine the client should be steered to the second access point and selects the client steering approach, and wherein the cloud controller can inform the first access point and the second access point such that the first access point and the second access point perform the client steering approach.

In a further exemplary embodiment, an access point in a Wi-Fi network configured to associate with Wi-Fi client devices based on a cloud controller includes a plurality of radios communicating on the distributed Wi-Fi system; and a processor communicatively coupled to the plurality of radios and configured to: associate with a client; receive notification from a cloud controller to steer the client to another access point based on a selected client steering approach which is selected by the cloud controller from a plurality of client steering approaches based on the client; and perform the client steering based on the selected client steering approach. The cloud controller can determine the client needs to be steered based on optimization based on operational parameters associated with the Wi-Fi network. The cloud controller can be configured to determine which client steering approaches work for each client and maintain a list for use in a determination of the selected client steering approach. The cloud controller can monitor a frequency of the plurality of client steering approaches for a particular client type, wherein selection of the client steering approach utilizes the frequency for the client based on the associated client type. The selected client steering approach can include the access point configured to disassociate the client, stop sending probe responses to the client, and, if the client still attempts to authenticate to the access point, send authentication failure to the client.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to data gathering systems and methods to enable the optimization of distributed Wi-Fi networks. It is an objective of the systems and methods to provide a Wi-Fi network with superior performance relative to Wi-Fi networks with a single AP, with repeaters, or with multiple mesh nodes. The systems and methods include a distributed Wi-Fi system with a plurality of access points (nodes) which are self-optimizing based on cloud-based control. This self-optimization adapts the topology and configuration of the plurality of access points in real-time based on the operating environment. The plurality of access points communicate with one another via backhaul links and to Wi-Fi client devices via client links, and the each of the backhaul links and each of the client links may use different channels based on the optimization, thereby avoiding the aforementioned limitations in Wi-Fi mesh or repeater systems. In an exemplary aspect, the distributed Wi-Fi system includes a relatively large number of access points (relative to conventional deployments including Wi-Fi mesh or repeater systems). For example, the large number of access points can be 6 to 12 or more in a typical residence. With a large number of access points, the distance between any two access points is small, on a similar scale as the distance between an access point and Wi-Fi client device. Accordingly, signal strength is maintained avoiding coverage issues, and with the optimization of the topology and configuration, congestion and interference are minimized. Thus, the distributed Wi-Fi system addresses all three of the aforementioned limitations in conventional Wi-Fi systems.

Distributed Wi-Fi System

Figure 1:
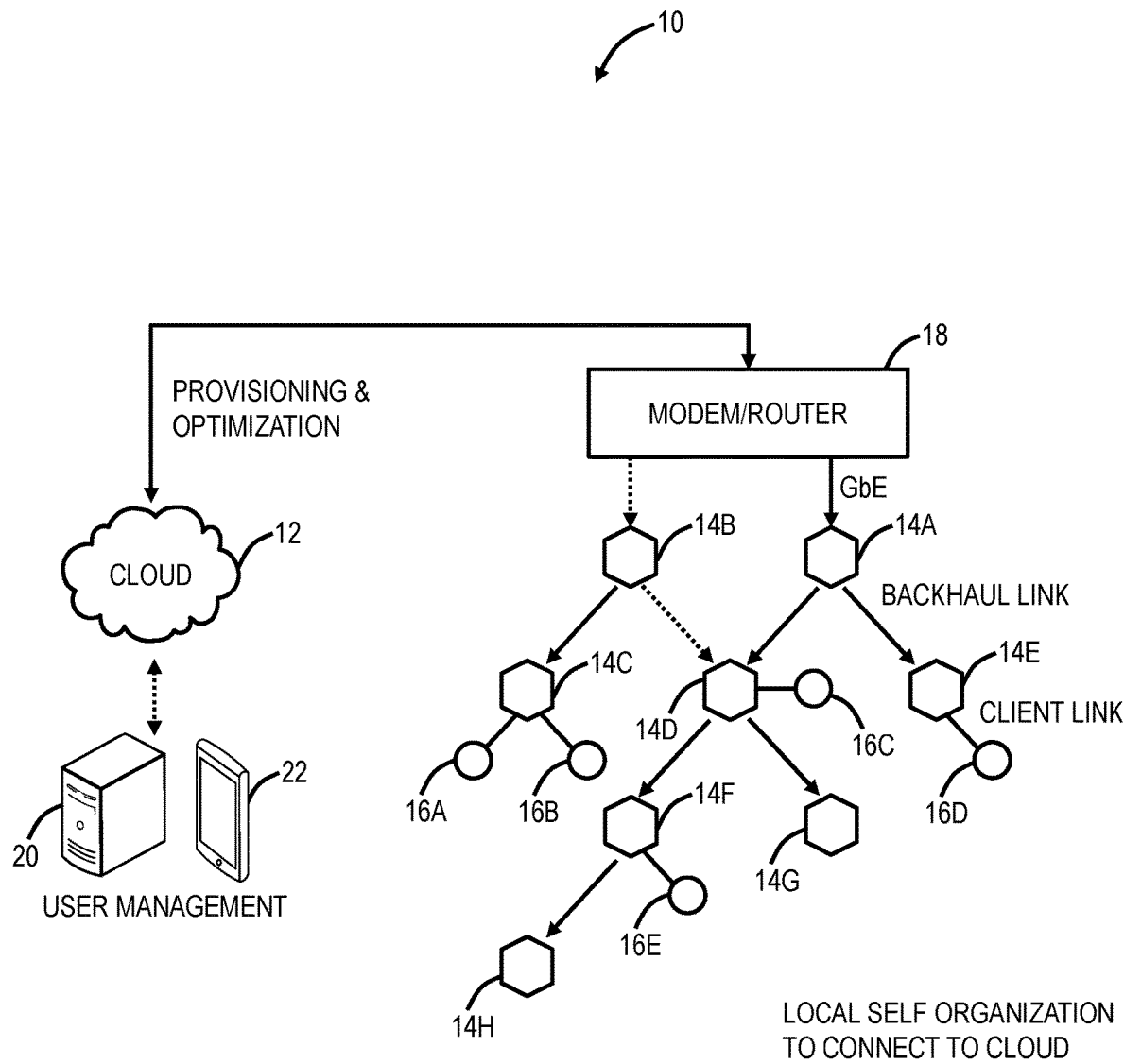
FIG. 1 is a network diagram of a distributed Wi-Fi system with cloud-based control.

Referring to FIG. 1, in an exemplary embodiment, a network diagram illustrates a Referring to FIG. 1, in an exemplary embodiment, a network diagram illustrates a distributed Wi-Fi system 10 with cloud-based 12 control. The distributed Wi-Fi system 10 can operate in accordance with the IEEE 802.11 protocols and variations thereof. The distributed Wi-Fi system 10 includes a plurality of access points 14 (labeled as access points 14A-14H) which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 is for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, or any network-enabled device. For external network connectivity, one or more of the access points 14 can be connected to a modem/router 18 which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This control is preferably done on servers 20 that can be reached across the Internet (the cloud 12) and accessed remotely such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an exemplary aspect, the distributed Wi-Fi system 10 includes cloud-based control (with a cloud-based controller or cloud service) to optimize, configure, and monitor the operation of the access points 14 and the Wi-Fi client devices 16. This cloud-based control is contrasted with a conventional operation which relies on a local configuration such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an exemplary gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
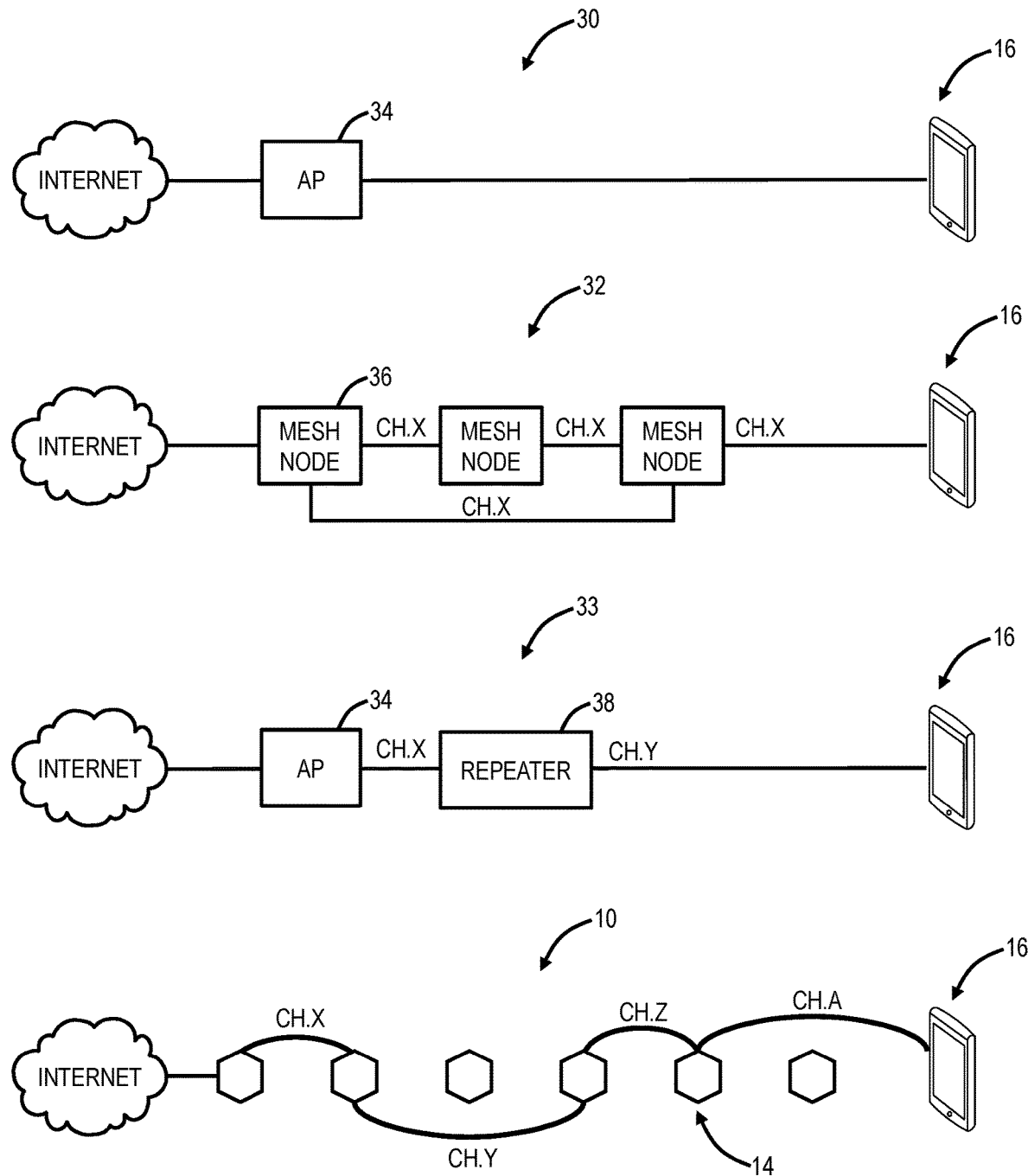
FIG. 2 is a network diagram of differences in operation of the distributed Wi-Fi system of FIG. 1 relative to a conventional single access point system, a Wi-Fi mesh network, and a Wi-Fi repeater system.

Referring to FIG. 2, in an exemplary embodiment, a network diagram illustrates differences in operation of the distributed Wi-Fi system 10 relative to a conventional single access point system 30, a Wi-Fi mesh network 32, and a Wi-Fi repeater network 33. The single access point system 30 relies on a single, high-powered access point 34 which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36 which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and, also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33 which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an exemplary aspect, the servers 20 in the cloud 12 are configured to optimize channel selection for the best user experience.

Configuration and Optimization Process for the Distributed Wi-Fi System

Figure 3:
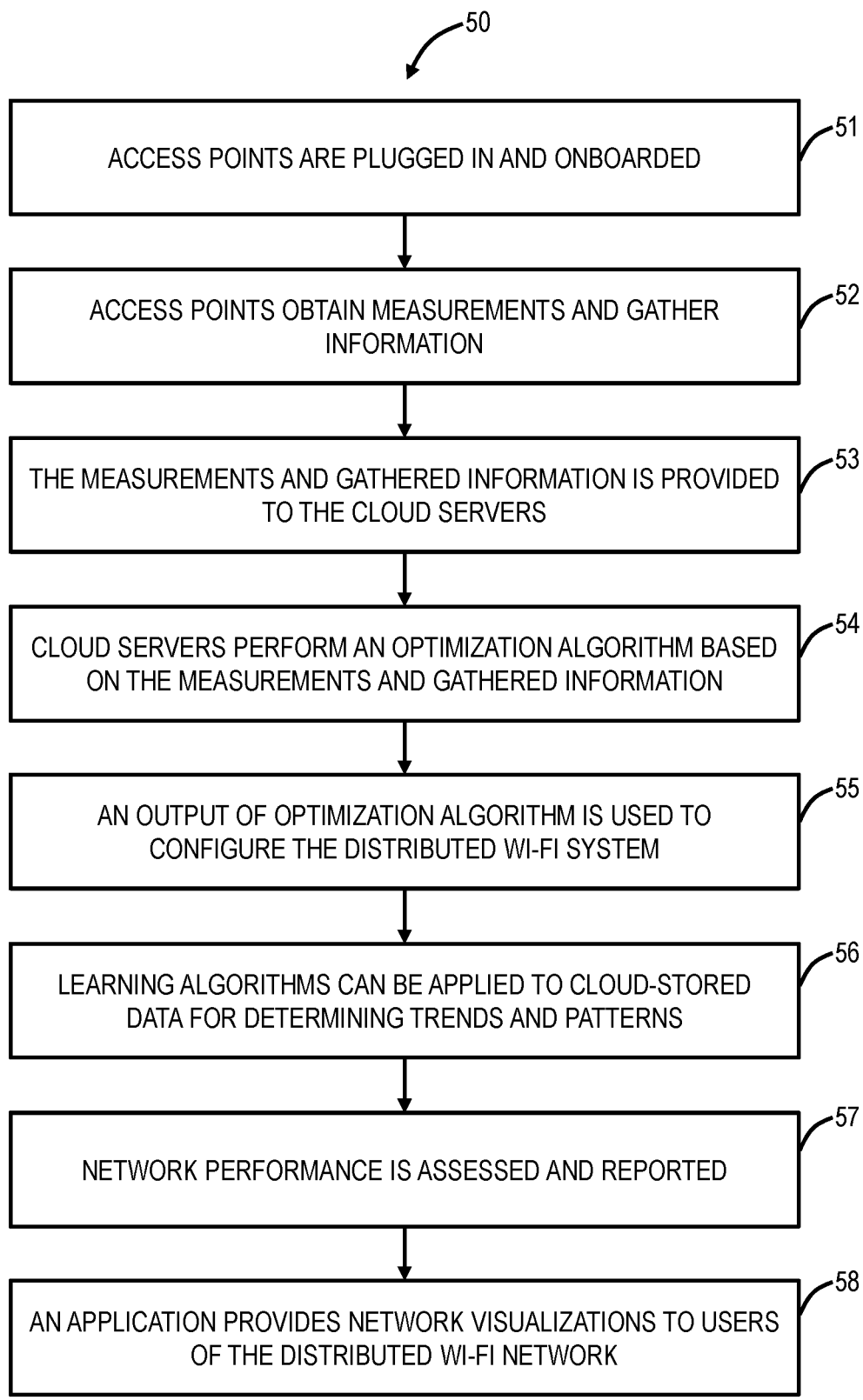
FIG. 3 is a flowchart of a configuration and optimization process for the distributed Wi-Fi system of FIG. 1.
Figure 4:
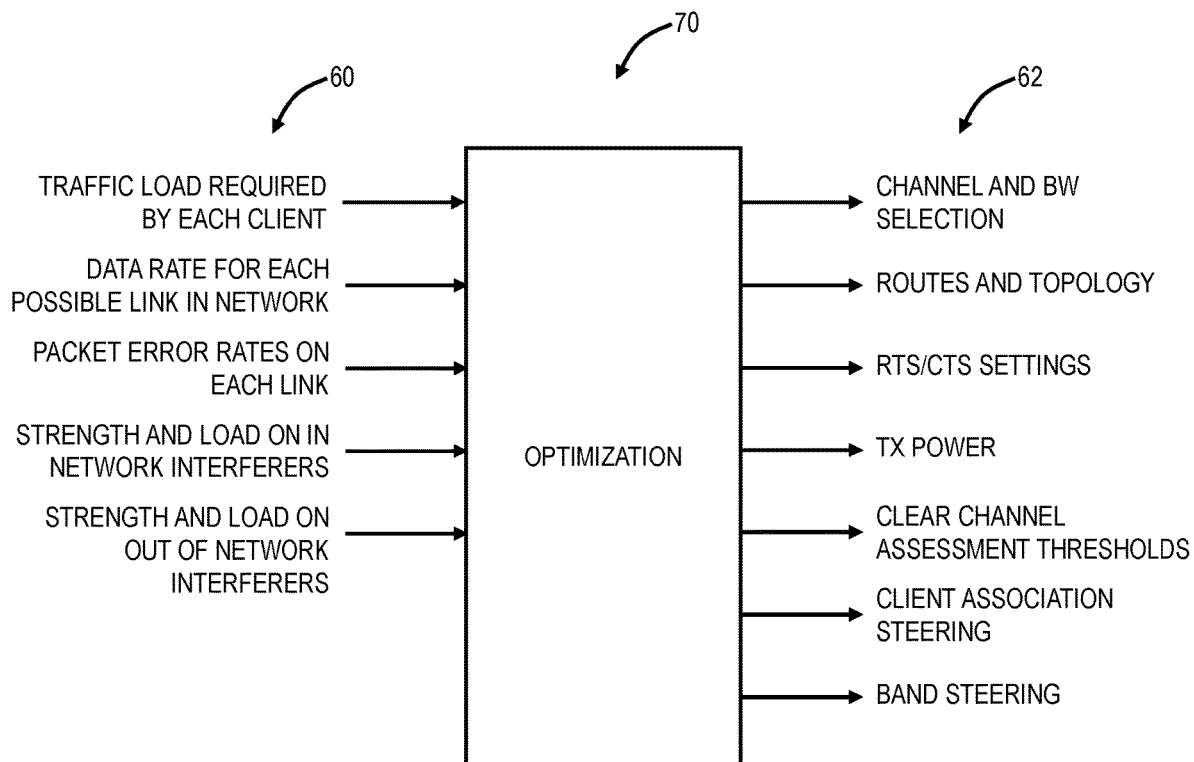
FIG. 4 is a block diagram of inputs and outputs to an optimization as part of the configuration and optimization process of FIG. 3.

Referring to FIG. 3, in an exemplary embodiment, a flowchart illustrates a configuration and optimization process 50 for the distributed Wi-Fi system 10. Specifically, the configuration and optimization process 50 includes various steps 51-58 to enable efficient operation of the distributed Wi-Fi system 10. These steps 51-58 may be performed in a different order and may be repeated on an ongoing basis, allowing the distributed Wi-Fi system 10 to adapt to changing conditions. First, each of the access points 14 are plugged in and onboarded (step 51). In the distributed Wi-Fi system 10, only a subset of the access points 14 are wired to the modem/router 18 (or optionally with a wireless connection to the modem/router 18), and those access points 14 without wired connectivity have to be onboarded to connect to the cloud 12. The onboarding step 51 ensures a newly installed access point 14 connects to the distributed Wi-Fi system 10 so that the access point can receive commands and provide data to the servers 20. The onboarding step 51 can include configuring the access point with the correct Service Set Identifier (SSID) (network ID) and associated security keys. In an exemplary embodiment, the onboarding step 51 is performed with Bluetooth or equivalent connectivity between the access point 14 and a user device 22 allowing a user to provide the SSID, security keys, etc. Once onboarded, the access point 14 can initiate communication with the distributed Wi-Fi system 10 to the servers 20 for configuration.

Second, the access points 14 obtain measurements and gather information to enable optimization of the networking settings (step 52). The information gathered can include signal strengths and supportable data rates between all nodes as well as between all nodes and all Wi-Fi client devices 16. Specifically, the measurement step 52 is performed by each access point 14 to gather data. Various additional measurements can be performed such as measuring an amount of interference, loads (throughputs) required by different applications operating over the distributed Wi-Fi system 10, etc. Third, the measurements and gathered information from the measurement step 52 is provided to the servers 20 in the cloud 12 (step 53). The steps 51-53 are performed on location at the distributed Wi-Fi system 10.

These measurements in steps 52, 53 could include traffic load required by each client, the data rate that can be maintained between each of the nodes and from each of the nodes to each of the clients, the packet error rates in the links between the nodes and between the nodes and the clients, and the like. In addition, the nodes make measurements of the interference levels affecting the network. This includes interference from other cloud controlled distributed Wi-Fi systems ("in-network interferers"), and interference coming from devices that are not part of the controllable network ("out-of-network interferers). It is important to make a distinction between these types of interferers. In-network interferers can be controlled by the cloud system, and therefore can be included in a large optimization over all in-network systems. Out of network interferers cannot be controlled from the cloud, and therefore their interference cannot be moved to another channel or otherwise changed. The system must adapt to them, rather than changing them. These out-of-network interferers include Wi-Fi networks that are not cloud controlled and non-Wi-Fi devices that transmit in the frequencies used by Wi-Fi such as Bluetooth devices, baby monitors, cordless phones, etc.

Another important input is the delay of packets traversing the network. These delays could be derived from direct measurements, time stamping packets as they arrive into the Wi-Fi network at the gateway, and measuring the elapsed time as they depart at the final node. However, such measurement would require some degree of time synchronization between the nodes. Another approach would be to measure the statistics of delay going through each node individually. The average total delay through the network and the distribution of the delays given some assumptions could then be calculated based on the delay statistics through each node individually. Delay can then become a parameter to be minimized in the optimization. It is also useful for the optimization to know the time that each node spends transmitting and receiving. Together with the amount of information transmitted or received, this can be used to determine the average data rate the various links are sustaining.

Fourth, the servers 20 in the cloud 12 use the measurements to perform an optimization algorithm for the distributed Wi-Fi system 10 (step 54). The optimization algorithm outputs the best parameters for the network operation. These include the selection of the channels on which each node should operate for the client links and the backhaul links, the bandwidth on each of these channels that the node should use, the topology of connection between the nodes and the routes for packets through that topology from any source to any destination in the network, the appropriate node for each client to attach to, the band on which each client should attach, etc.

Specifically, the optimization uses the measurements from the nodes as inputs to an objective function which is maximized. A capacity for each link can be derived by examining the amount of data that has been moved (the load), and the amount of time that the medium is busy due to interference. This can also be derived by taking a ratio of the data moved across the link to the fraction of the time that the transmitting queue was busy. This capacity represents the hypothetical throughput that could be achieved if the link was loaded to saturation and was moving as much data as it possibly could.

Fifth, an output of the optimization is used to configure the distributed Wi-Fi system 10 (step 55). The nodes and client devices need to be configured from the cloud based on the output of the optimization. Specific techniques are used to make the configuration fast, and to minimize the disruption to a network that is already operating. The outputs of the optimization are the operational parameters for the distributed Wi-Fi system 10. This includes the frequency channels on which each of the nodes is operating, and the bandwidth of the channel to be used. The 802.11ac standard allows for channel bandwidths of 20, 40, 80, and 160 MHz. The selection of the bandwidth to use is a tradeoff between supporting higher data rates (wide channel bandwidth), and having a larger number of different non-interfering channels to use in the distributed Wi-Fi system 10. The optimization tries to use the lowest possible channel bandwidth for each link that will support the load required by the various user's applications. By using the narrowest sufficient throughput channels, the maximum number of non-interfering channels are left over for other links within the distributed Wi-Fi system 10.

The optimization generates the outputs from the inputs as described above by maximizing an objective function. There are many different possible objective functions. One objective could be to maximize the total throughput provided to all the clients. This goal has the disadvantage that the maximum total throughput might be achieved by starving some clients completely, in order to improve the performance of clients that are already doing well. Another objective could be to enhance as much as possible the performance of the client in the network in the worst situation (maximize the minimum throughput to a client). This goal helps promote fairness but might trade a very large amount of total capacity for an incremental improvement at the worst client. A preferred approach considers the load desired by each client in a network, and maximizing the excess capacity for that load ratio. The optimization can improve the capacity, as well as shift the capacity between the two APs. The desired optimization is the one that maximizes the excess capacity in the direction of the ratio of the loads. This represents giving the distributed Wi-Fi system 10 the most margin to carry the desired loads, making their performance more robust, lower latency, and lower jitter. This strict optimization can be further enhanced by providing a softer optimization function that weighs assigning capacities with a varying scale. A high utility value would be placed on getting the throughput to be higher than the required load. Providing throughput to a client or node above the required load would still be considered a benefit, but would be weighted much less heavily than getting all the clients/nodes to the load they are requiring. Such a soft weighted optimization function allows for a more beneficial tradeoff of excess performance between devices.

Another set of optimization outputs defines the topology of the distributed Wi-Fi system 10, meaning which nodes connect to which other nodes. The actual route through the distributed Wi-Fi system 10 between two clients or the client and the Internet gateway (modem/router 18) is also an output of the optimization. Again, the optimization attempts to choose the best tradeoff in the route. Generally, traversing more hops makes each hop shorter range, higher data rate, and more robust. However, more hops add more latency, more jitter, and depending on the channel frequency assignments, takes more capacity away from the rest of the system.

Sixth, learning algorithms can be applied to cloud-stored data for determining trends and patterns (step 56). Note, the servers 20 can store the measurements from the nodes, results from the optimizations, and subsequent measurements after associated optimizations. With this data, trends and patterns can be determined and analyzed for various purposes. Because reconfiguring a network takes time and is always at least partially disruptive to active communication, it is beneficial to configure the network for peak load, before that peak load arrives. By learning from the historical data that has already been captured, it is possible to predict the usage and interference that will occur at a future time. Other uses of learning on the captured data include identifying bugs and discovering bugs in the behavior of client devices. Once bugs in the behavior of client devices are discovered, it may be possible to work around those bugs using tools and commands from the infrastructure side of the network.

Seventh, the performance of the network can be assessed and reported to the user or to a service provider whose services are running over Wi-Fi (step 57). Eighth, an application (such as a mobile app operating on the user device 22) can provide a user visibility into the network operation (step 58). This would include the display of network activity and performance metrics. The mobile app can be used to convey information to the user, make measurements, and allow the user to control certain aspects of Wi-Fi the network operation. The mobile app also communicates to the internet over the cellular system to assist in onboarding the nodes when they are first being set up. The mobile phone app, utilizing the cellular system, also provides a way for the Wi-Fi network to communicate with the internet and cloud when the user's normal internet connection is not functioning. This cellular based connection can be used to signal status, notify the service provider and other users, and can even be used to carry data from the home to the internet during the time that the user's normal internet connection is malfunctioning.

The configuration and optimization process 50 is described herein with reference to the distributed Wi-Fi system 10 as an exemplary embodiment. Those skilled in the art will recognize the configuration and optimization process 50 can operate with any type of multiple node Wi-Fi system (i.e., a distributed Wi-Fi network or Wi-Fi system) including the Wi-Fi mesh network 32, the Wi-Fi repeater network 33, etc. For example, cloud-based control can also be implemented in the Wi-Fi mesh network 32, the Wi-Fi repeater network 33, etc. and the various systems and methods described herein can operate as well here for cloud-based control and optimization. Also, the terminology "distributed Wi-Fi network" or "Wi-Fi system" can also apply to the Wi-Fi mesh network 32, the Wi-Fi repeater network 33, etc. whereas the distributed Wi-Fi system 10 is a specific embodiment of a distributed Wi-Fi network. That is the distributed Wi-Fi system 10 is similar to the Wi-Fi mesh network 32, the Wi-Fi repeater network 33, etc. in that it does support multiple nodes, but it does have the aforementioned distinctions to overcome limitations associated with each.

Optimization

Referring to FIG. 3, in an exemplary embodiment, a block diagram illustrates inputs 60 and outputs 62 to an optimization 70. The inputs 60 can include, for example, traffic load required by each client, signal strengths between nodes and between access points 14 (nodes) and Wi-fi client devices 16, data rate for each possible link in the network, packet error rates on each link, strength and load on in-network interferers, and strength and load on out-of-network interferers. Again, these inputs are based on measurements and data gathered by the plurality of access points 14 and communicated to the servers 20 in the cloud 12. The servers 20 are configured to implement the optimization 70. The outputs of the optimization 70 include, for example, channel and bandwidth (BW) selection, routes and topology, Request to Send/Clear to Send (RTS/CTS) settings, Transmitter (TX) power, clear channel assessment thresholds, client association steering, and band steering.

Access Point

Figure 5:
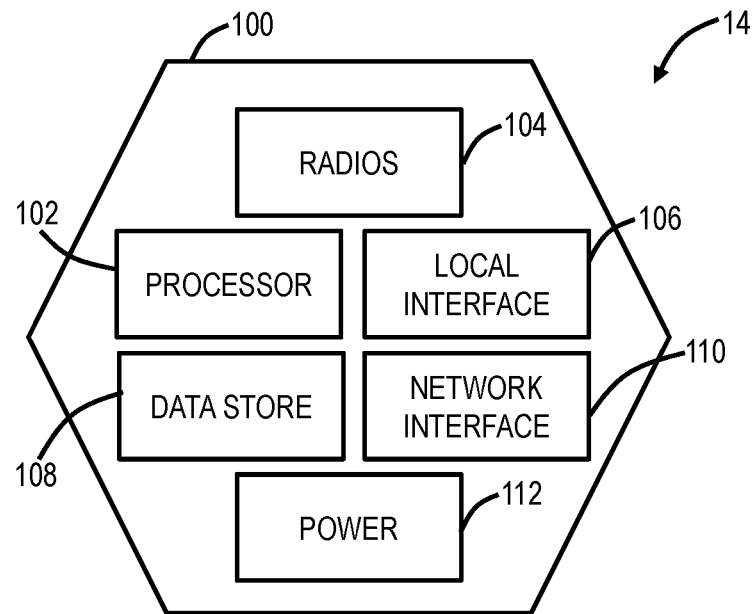
FIG. 5 is a block diagram of functional components of the access point in the distributed Wi-Fi system of FIG. 1.

Referring to FIG. 5, in an exemplary embodiment, a block diagram illustrates functional components of the access point 14 in the distributed Wi-Fi system 10. The access point 14 includes a physical form factor 100 which contains a processor 102, a plurality of radios 104, a local interface 106, a data store 108, a network interface 110, and power 112. It should be appreciated by those of ordinary skill in the art that FIG. 5 depicts the access point 14 in an oversimplified manner, and a practical embodiment may include additional components and suitably configured processing logic to support features described herein or known or conventional operating features that are not described in detail herein.

In an exemplary embodiment, the form factor 100 is a compact physical implementation where the access point 14 directly plugs into an electrical socket and is physically supported by the electrical plug connection to the electrical socket. This compact physical implementation is ideal for a large number of access points 14 distributed throughout a residence. The processor 102 is a hardware device for executing software instructions. The processor 102 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the access point 14 is in operation, the processor 102 is configured to execute software stored within memory or the data store 108, to communicate data to and from the memory or the data store 108, and to generally control operations of the access point 14 pursuant to the software instructions. In an exemplary embodiment, the processor 102 may include a mobile-optimized processor such as optimized for power consumption and mobile applications.

The radios 104 enable wireless communication in the distributed Wi-Fi system 10. The radios 104 can operate according to the IEEE 802.11 standard. The radios 104 include address, control, and/or data connections to enable appropriate communications on the distributed Wi-Fi system 10. As described herein, the access point 14 includes a plurality of radios to support different links, i.e., backhaul links and client links. The optimization 70 determines the configuration of the radios 104 such as bandwidth, channels, topology, etc. In an exemplary embodiment, the access points 14 support dual band operation simultaneously operating 2.4 GHz and 5 GHz 2×2 MIMO 802.11b/g/n/ac radios having operating bandwidths of 20/40 MHz for 2.4 GHz and 20/40/80 MHz for 5 GHz. For example, the access points 14 can support IEEE 802.11AC1200 gigabit Wi-Fi (300+867 Mbps).

The local interface 106 is configured for local communication to the access point 14 and can be either a wired connection or wireless connection such as Bluetooth or the like. Since the access points 14 are configured via the cloud 12, an onboarding process is required to first establish connectivity for a newly turned on access point 14. In an exemplary embodiment, the access points 14 can also include the local interface 106 allowing connectivity to the user device 22 (or a Wi-Fi client device 16) for onboarding to the distributed Wi-Fi system 10 such as through an app on the user device 22. The data store 108 is used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The network interface 110 provides wired connectivity to the access point 14. The network interface 104 may be used to enable the access point 14 communicate to the modem/router 18. Also, the network interface 104 can be used to provide local connectivity to a Wi-Fi client device 16 or user device 22. For example, wiring in a device to an access point 14 can provide network access to a device which does not support Wi-Fi. In an exemplary embodiment, all of the access points 14 in the distributed Wi-Fi system 10 include the network interface 110. In another exemplary embodiment, select access points 14 which connect to the modem/router 18 or require local wired connections have the network interface 110. The network interface 110 may include, for example, an Ethernet card or adapter (e.g., 10 BaseT, Fast Ethernet, Gigabit Ethernet, 10 GbE). The network interface 110 may include address, control, and/or data connections to enable appropriate communications on the network.

The processor 102 and the data store 108 can include software and/or firmware which essentially controls the operation of the access point 14, data gathering and measurement control, data management, memory management, and communication and control interfaces with the server 20 via the cloud. The processor 102 and the data store 108 may be configured to implement the various processes, algorithms, methods, techniques, etc. described herein.

Cloud Server and User Device

Figure 6:
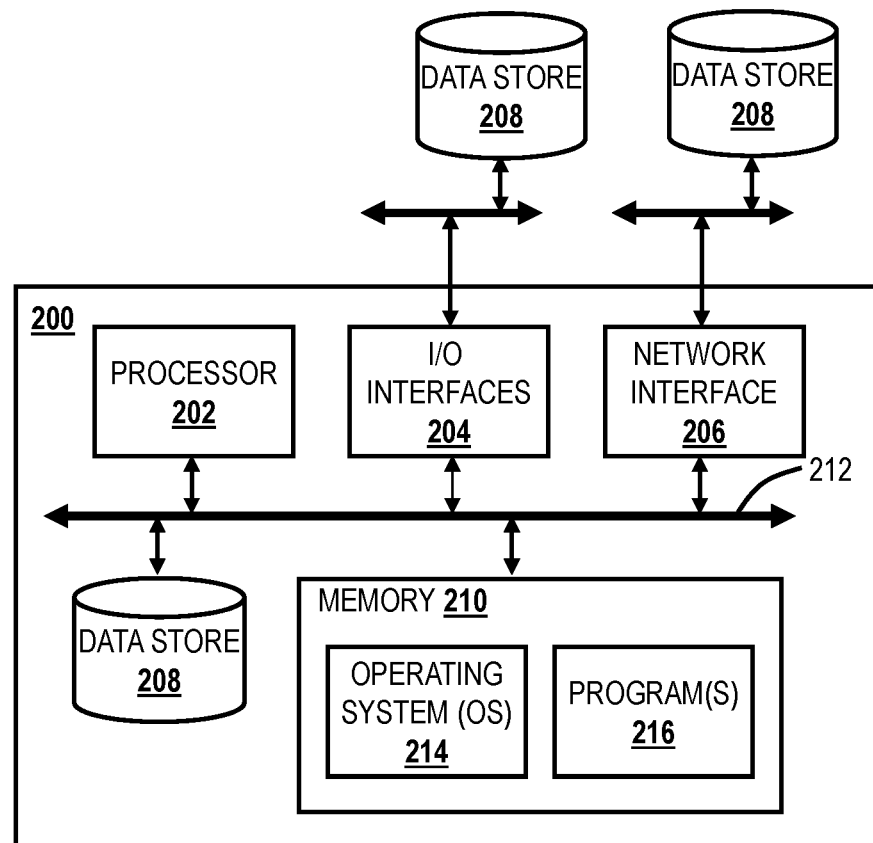
FIG. 6 is a block diagram of functional components of a server, a Wi-Fi client device, or a user device which may be used with the distributed Wi-Fi system of FIG. 1.

Referring to FIG. 6, in an exemplary embodiment, a block diagram illustrates functional components of the server 20, the Wi-Fi client device 16, or the user device 22 which may be used with the distributed Wi-Fi system 10. FIG. 6 illustrates functional components which can form any of the Wi-Fi client device 16, the server 20, the user device 22, or any general processing device. The server 20 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 6 depicts the server 20 in an oversimplified manner, and a practical embodiment may include additional components and suitably configured processing logic to support features described herein or known or conventional operating features that are not described in detail herein.

The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 20, a semiconductor-based microprocessor (in the form of a microchip or chip set), or generally any device for executing software instructions. When the server 20 is in operation, the processor 202 is configured to execute software stored within the memory 210, to communicate data to and from the memory 210, and to generally control operations of the server 20 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 20 to communicate on a network, such as the cloud 12. The network interface 206 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 20 such as, for example, an internal hard drive connected to the local interface 212 in the server 20. Additionally, in another embodiment, the data store 208 may be located external to the server 20 such as, for example, an external hard drive connected to the I/O interfaces 204 (e.g., SCSI or USB connection). In a further embodiment, the data store 208 may be connected to the server 20 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein, such as related to the optimization 70.

Client Steering

Again, one of the outputs of the configuration and optimization process 50 is to configure the Wi-Fi client devices 16 that are associated with the distributed Wi-Fi system 10 (or any other Wi-Fi network). This can be referred to herein as "client steering." In conventional systems, the Wi-Fi client devices 16 locally determine which access point to associate with. Thus, conventional client association is distributed. In the systems and methods described herein, client association can be part of the configuration and optimization process 50 and controlled by the cloud controller. That is, the distributed Wi-Fi system 10 or any other Wi-Fi network can have client association decisions made remotely in the cloud 12. The main tenets of the client steering are that it should result in the least amount of disruption to the Wi-Fi connectivity on Wi-Fi client devices 16 and work with the majority of Wi-Fi client devices 16.

Figure 7:
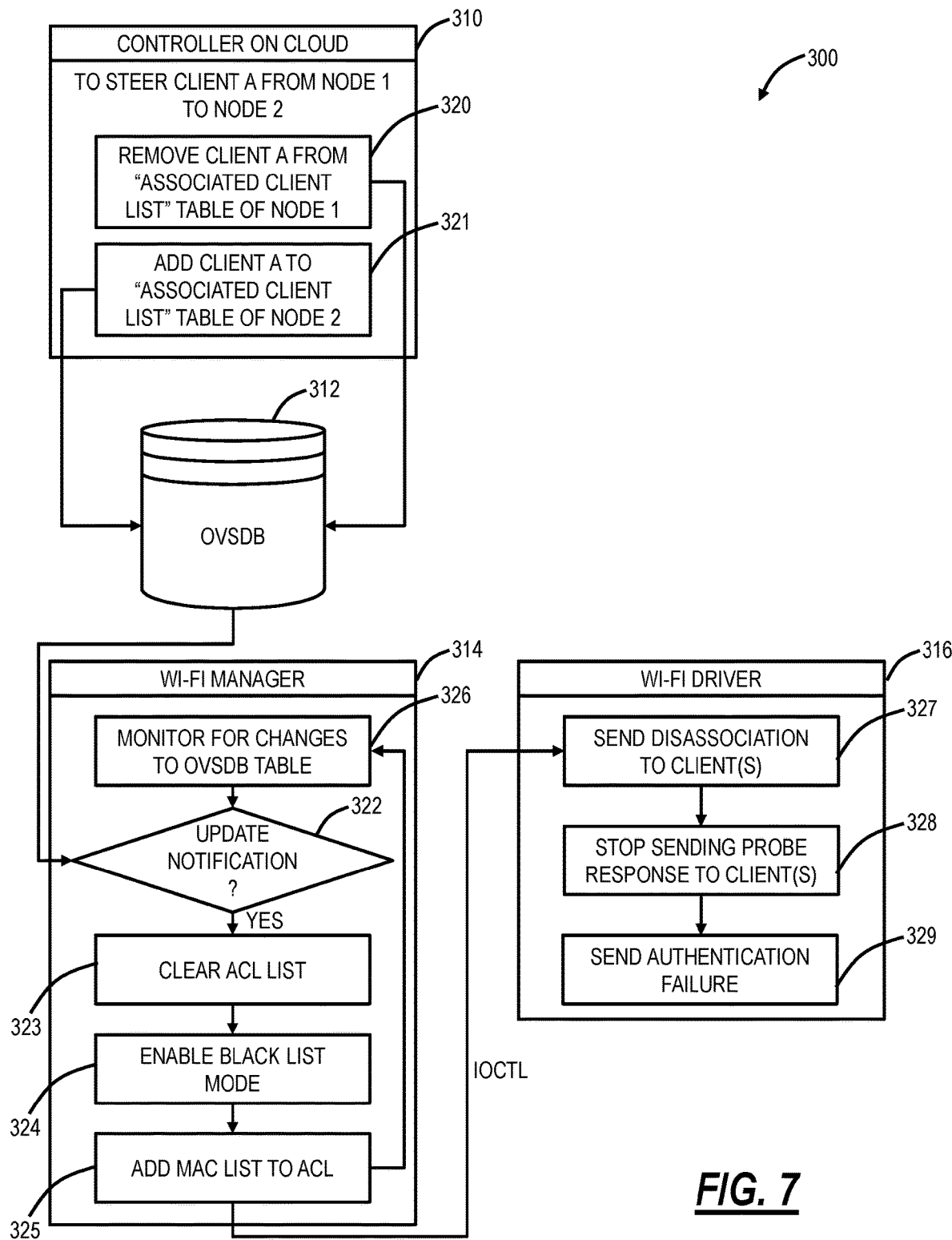
FIG. 7 is a flow diagram of a client steering process for use with any distributed Wi-Fi network for controlling client associations remotely.

Referring to FIG. 7, in an exemplary embodiment, a flow diagram illustrates a client steering process 300 for use with any distributed Wi-Fi network for controlling client associations remotely. The client steering process 300 is described with reference to a cloud controller 310 in the cloud 12, an Open vSwitch Database (OVSDB) 312, a Wi-Fi manager 314 associated with an access point 14, and a Wi-Fi driver 316 also associated with the access point 14. The cloud controller 310 can be the server 20 in the cloud 12. The OVSDB 312 is a management protocol in a Software Defined Networking (SDN) environment. Most network devices allow for remote configuration using legacy protocols, such as simple network management protocol (SNMP). The focus with OVSDB was to create a modern, programmatic management protocol interface. The OVSDB 312 can be based on RFC 7047 "The Open vSwitch Database Management Protocol," (December 2013), the contents of which are incorporated by reference. The access point 14 can execute the Wi-Fi manager 314, such as via the processor 102, and the Wi-Fi driver 316 can be used to control Wi-Fi interfaces on the radios 104. The client steering process 300 is robust and will work with nearly all Wi-Fi client devices 16.

For illustration purposes, the client steering process 300 is illustrated with respect to a single client being steered from a node 1 to a node 2 (i.e., access points 14). Note, the access point 14 associated with the Wi-Fi manager 314 and the Wi-Fi driver 316 is the one currently associated with the Wi-Fi client 16, i.e., the node 1, and the cloud controller 310 is steering the client with the client steering process 300 to another access point 14, i.e., the node 2, which is not shown in FIG. 7. However, the node 2 has a similar Wi-Fi manager 314 and Wi-Fi driver 316. Those skilled in the art will recognize the client steering process 300 can be used for multiple Wi-Fi client devices 16 and for multiple Wi-Fi networks. The cloud controller 310 can determine the need to steer Wi-Fi client devices 16 based on the configuration and optimization process 50. However, the Wi-Fi client devices 16 can be steered for any reason including load balancing, optimization, maintenance, off-channel scanning, etc.

The cloud controller 310 determines the client (i.e., a Wi-Fi client device 16) needs to be steered from the node 1 to the node 2. Specifically, the cloud controller 310 can maintain an Associated Client List (ACL) table for each access node 14 under its control. For the client steering process 300, the cloud controller 310 can add/remove a specified Wi-Fi client device 16 from the ACL tables of the associated access points 14 (steps 320, 321). For example, to steer a client A away from node 1 to node 2, the cloud controller 310 removes the client A from the ACL table of node 1 and adds the client to the ACL table of node 2.

In the client steering process 300, the cloud controller 310 sends messages to various nodes in the Wi-Fi network with details of the clients that need to be steered along with the type of steering technique to use. In an exemplary embodiment, the cloud controller 310 can use the OVSDB 312 for such messages to the nodes. For example, the cloud controller 310 can provide updates to the ACL tables for each node via the OVSDB 312. The access points 14 (nodes) can act upon updates, namely, disassociate from clients which are removed and attempt to associate from clients that are added.

When the cloud controller 310 performs the addition/removal of the node A from the ACL table (steps 320, 321), an update notification message can be sent to the Wi-Fi manager 314 of both the node 1 and the node 2 (step 322). The node 1 can clear its ACL list (step 323), enable a blacklist mode (step 324), and add the Media Access Control (MAC) address (or some other unique identifier) of the client A to a blacklist in the ACL list (step 325). The Wi-Fi manager 314 of the node 1 can then proceed to a state where it waits until there are changes from the OVSDB 312 (step 326). The Wi-Fi manager 314 of the node 1 can make a call to the Wi-Fi driver 316 (e.g., an Input/Output Control (IOCTL)).

Upon receiving this call, the node 1 to which the client A is currently associated does the following—sends out a disassociation request to the client A (step 327), stops responding to probe requests from that client A (step 328), and sends out an authentication failure with reason code 34 if client still attempts to associate (step 329). Also, other nodes and the node 1 in the Wi-Fi network which do not have the client A in their ACL list do not respond to probe requests from the client A. Conversely, the node 2 to which client A is being steered to responds to probe requests from that client A.

There are other approaches that can be used for steering Wi-Fi client devices 16 from one access point 14 to another. These approaches may be less general, but may also act much faster, reducing the period of disruption on the network while a Wi-Fi client device 16 is moving its association from one access point 14 to another. One such mechanism would be to use the Channel Switch Announcement or CSA. Clients that understand the IEEE 802.11 standardized channel switch announcement will follow that instruction at an agreed upon time to move channels very rapidly. However, while the CSA will induce a rapid channel switch, it will not by itself cause the device to roam to a new access point 14. Once the CSA has been used to get the Wi-Fi client device 16 to change channels rapidly, the actual roaming can be caused by sending the Wi-Fi client device 16 a disassociation message. This message can be sent by the new access point 14 on the new channel, that access point 14 spoofing itself as the old access point 14 on the old channel by spoofing the Basic Service Set Identifier (BSSID) of the old access point 14. Even without an explicit dissociation message, some Wi-Fi client devices 16 will time out their old connection and discover the new access point 14 more quickly than when the CSA is not sent. Some Wi-Fi client devices 16 are very slow to scan and find a new access point 14 on a new channel following a disassociation message.

There are also mechanisms to get Wi-Fi client devices 16 to roam from one access point 14 to another within assisted roaming in the IEEE 802.11k standards and directed multicast in the IEEE 802.11v standards. These mechanisms are advantageous because they can cause the Wi-Fi client devices 16 to move to the new access point 14 more quickly, with less disruption of service. However, not all Wi-Fi client devices 16 support these modes of operation. Similarly, the use of IEEE 802.11r, the fast roaming protocol, can also be used to accelerate the transition from one access point 14 to another. However, like IEEE 802.11k and IEEE 802.11v, this approach is not supported on all Wi-Fi client devices 16.

Note, the cloud controller 310 can use the client steering process 300, CSA announcements, fast roaming in the IEEE 802.11r standards, assisted roaming in the IEEE 802.11k standards, and directed multicast in the IEEE 802.11v standards, etc. As described herein, the cloud controller 310 can utilize a plurality of steering approaches including the client steering process 300, a CSA, causing access points 14 to disassociate, blacking listing the client in an ACL list for an access point, Because not all approaches (CSA, fast roaming in the IEEE 802.11k and IEEE 802.11v standards) are supported by all Wi-Fi client devices 16, and some approaches are quicker on some Wi-Fi client devices 16 but not others, it is important for the cloud controller 310 to learn which Wi-Fi client devices 16 support which approaches, and which approaches create the shortest network disruption on a given Wi-Fi client device 16. In addition to learning which approaches work, it is also necessary to learn how often a given approach should be used. Some devices will tolerate only a certain number of disassociations before they give up on the network in questions and refuse to connect again. Limits must be placed on the number and frequency of steering commands of any of the types previously listed to a particular client. These limits are client type specific and must be learned by observing the behavior of a number of devices over a period of time. A learning system based in the cloud controller 310 is a good way to accomplish this. Such a system has visibility into the behavior of a large number of Wi-Fi client devices 16, allowing it to extract the statistics necessary to understand which Wi-Fi client devices 16 operate best with which approaches.

An approach for doing this is to have the networking nodes (access points 14) keep track of the behavior of various Wi-Fi client devices 16 to different steering algorithms using the client MAC address and client name and report them back to the cloud controller 310. Other client specific information, such as the DNS mechanisms the device is using, protocol stack versions, etc., might also be reported to the controller to aid in identifying the type of devices being managed. This helps the system learn the client behavior so that a variant of client steering algorithm can be used to steer different client devices. Along with learning which approach works best, the system can learn specific details about how each approach can be optimized for a particular Wi-Fi client device 16. For example, sending out a dissociation request and not responding to probe requests might be sufficient to steer most Wi-Fi client devices 16, but there might be a specific set of Wi-Fi client devices 16 that might require sending out an authentication failure to be steered.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented by a cloud controller for steering Wi-Fi client devices in a Wi-Fi network, the method comprising:

managing a database which contains a plurality of client devices under management of the cloud controller, a plurality of access points under management of the cloud controller, and an association of each client device to a corresponding access point, wherein the cloud controller is connected to the plurality of access points via the Internet;

determining a client needs to be steered from a first access point to a second access point;

selecting a client steering approach from a plurality of client steering approaches based on the client; and causing the client to be steered from the first access point to the second access point based on the selected client steering approach by: updating Associated Client Lists in the database including updating a first associated client list in the database associated with the first access point to remove the client from the first associated client list and updating a second associated client list in the database associated with the second access point to add the client to the second associated list; and sending messages, responsive to the updates to the Associated Client Lists, to notify at least the first access point and the second access point that the Associated Client Lists have been updated to steer the client via the selected client steering approach, wherein the steering includes the first access point removing the client from a locally stored associated client list of the first access point and adding the client to a locally stored blacklist of the first access point, and the second access point adding the client to a locally stored associated client list of the second access point.

2. The method of claim 1, wherein the determining is based on optimization performed by the cloud controller based on operational parameters associated with the Wi-Fi network.

3. The method of claim 1, wherein the client steering approach comprises:
causing the first access point to disassociate the client, causing the first access point to stop sending probe responses to the client, and, if the client still attempts to authenticate to the first access point, causing the first access point to send authentication failure to the client.

4. The method of claim 1, wherein the client steering approach comprises:
informing the first access point that is should no longer be connected to the client; and
informing the second access point to accept connection from the client.

5. The method of claim 1, wherein the client steering approach includes:
providing a Channel Switch Announcement (CSA) to the client through the first access point.

6. The method of claim 1, further comprising:
determining which client steering approaches work for each client and utilizing the determining in the selecting.

7. The method of claim 1, further comprising:
monitoring a frequency of the plurality of client steering approaches for a particular client type, wherein the selecting utilizes the frequency for the client based on the associated client type to select the client steering approach.

8. The method of claim 1, wherein the cloud controller determines the client should be steered to the second access point and selects the client steering approach, and wherein the causing comprises the cloud controller informing the first access point and the second access point such that the first access point and the second access point perform the client steering approach.

9. A cloud controller configured to steer Wi-Fi client devices in a Wi-Fi network, the cloud controller comprising:
a network interface communicatively coupled to the Wi-Fi network, wherein the cloud controller is connected to a plurality of access points via the Internet;
one or more processors communicatively coupled to the network interface; and
memory storing instructions that, when executed, cause the one or more processors to:
manage a database which contains a plurality of client devices under management of the cloud controller, the plurality of access points under management of the cloud controller, and an association of each client device to a corresponding access point;
determine a client needs to be steered from a first access point to a second access point;
select a client steering approach from a plurality of client steering approaches based on the client; and
cause the client to be steered from the first access point to the second access point based on the selected client steering approach by: updating Associated Client Lists in the database including updating a first associated client list associated with the first access point to remove the client from the first associated client list and updating a second associated client list associated with the second access point to add the client to the second associated list and sending messages, responsive to the updates to the Associated Client Lists, to notify at least the first access point and the second access point that the Associated Client Lists have been updated to steer the client via the selected client steering approach, wherein the steering includes the first access point removing the client from a locally stored associated client list of the first access point and adding the client to a locally stored blacklist of the first access point, and the second access point adding the client to a locally stored associated client list of the second access point.

10. The cloud controller of claim 9, wherein the cloud controller determines the client needs to be steered based on optimization based on operational parameters associated with the Wi-Fi network.

11. The cloud controller of claim 9, wherein the client steering approach comprises the cloud controller:
causing the first access point to disassociate the client, causing the first access point to stop sending probe responses to the client, and, if the client still attempts to authenticate to the first access point, causing the first access point to send authentication failure to the client.

12. The cloud controller of claim 9, wherein the client steering approach includes the cloud controller:
providing a Channel Switch Announcement (CSA) to the client through the first access point.

13. The cloud controller of claim 9, wherein the memory storing instructions that, when executed, further cause the one or more processors to:
determine which client steering approaches work for each client and utilize the determination to select the client steering approach.

14. The cloud controller of claim 9, wherein the memory storing instructions that, when executed, further cause the one or more processors to:
monitor a frequency of the plurality of client steering approaches for a particular client type, wherein selection of the client steering approach utilizes the frequency for the client based on the associated client type.

15. The cloud controller of claim 9, wherein the cloud controller determines the client should be steered to the second access point and selects the client steering approach, and wherein the cloud controller informs the first access point and the second access point such that the first access point and the second access point perform the client steering approach.

16. An access point in a Wi-Fi network configured to associate with Wi-Fi client devices based on a cloud controller, the access point comprising:
a plurality of radios communicating on the distributed Wi-Fi system; and
a processor communicatively coupled to the plurality of radios and configured to:
communicate with a cloud controller which manages a database containing a plurality of client devices under management of the cloud controller, a plurality of access points including the access point under management of the cloud controller, and an association of each client device to a corresponding access point, wherein the cloud controller is connected to the plurality of access points via the Internet;
associate with a client and notify the cloud controller of the association;
receive notification from the cloud controller to steer the client to an other access point based on a selected client steering approach which is selected by the cloud controller from a plurality of client steering approaches based on the client, wherein the cloud controller provides the notification based on an update to Associated Client Lists in the database where a first associated client list in the database associated with the access point is updated to remove the client from the first associated client list and a second associated client list in the database associated with the other access point is updated to add the client to the second associated client list; and perform the client steering based on the selected client steering approach, the steering including removing the client from a locally stored associated client list of the access point and adding the client to a locally stored blacklist.

17. The access point of claim 16, wherein the cloud controller determines the client needs to be steered based on optimization based on operational parameters associated with the Wi-Fi network.

18. The access point of claim 16, wherein the cloud controller is configured to determine which client steering approaches work for each client and maintain a list for use in a determination of the selected client steering approach.

19. The access point of claim 16, wherein the cloud controller monitors a frequency of the plurality of client steering approaches for a particular client type, wherein selection of the client steering approach utilizes the frequency for the client based on the associated client type.

20. The access point of claim 16, wherein the selected client steering approach includes the access point configured to:

disassociate the client, stop sending probe responses to the client, and, if the client still attempts to authenticate to the access point, send authentication failure to the client.

* * * * *